(12) United States Patent
Zhang et al.

(10) Patent No.: US 11,948,336 B2
(45) Date of Patent: Apr. 2, 2024

(54) METHOD AND APPARATUS FOR POINT CLOUD CODING

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 409 days.

(21) Appl. No.: 17/354,834

(22) Filed: Jun. 22, 2021

(65) Prior Publication Data

US 2022/0156980 A1    May 19, 2022

Related U.S. Application Data

(60) Provisional application No. 63/114,451, filed on Nov. 16, 2020.

(51) Int. Cl.
| | |
|---|---|
| *G06K 9/36* | (2006.01) |
| *G06T 9/00* | (2006.01) |
| *H04N 19/184* | (2014.01) |
| *H04N 19/96* | (2014.01) |

(52) U.S. Cl.
CPC ............ *G06T 9/00* (2013.01); *H04N 19/184* (2014.11); *H04N 19/96* (2014.11)

(58) Field of Classification Search
CPC .. G06T 9/00; G06T 9/001; G06T 9/40; G06T 2207/10028; G06T 15/08; H04N 19/184; H04N 19/96; H04N 19/597; H04N 19/70; G05T 15/00; G05T 15/005
See application file for complete search history.

(56) References Cited

U.S. PATENT DOCUMENTS

2020/0252659 A1 *  8/2020  Lasang ................. H04N 19/44
2020/0396489 A1 * 12/2020  Flynn ...................... G06T 9/40

FOREIGN PATENT DOCUMENTS

WO    WO2019/195920 A1    10/2019

OTHER PUBLICATIONS

Supplementary European Search Report dated Feb. 20, 2023 in Application No. 21892498.3, 8 pages.

(Continued)

*Primary Examiner* — Duy M Dang
(74) *Attorney, Agent, or Firm* — ARENTFOX SCHIFF LLP

(57) ABSTRACT

Aspects of the disclosure provide methods and apparatuses for point cloud compression and decompression. In some examples, an apparatus for point cloud compression/decompression includes processing circuitry. In some examples, the processing circuitry receives a bitstream carrying compressed data for a point cloud. The processing circuitry determines that a current node in an octree structure is eligible for an isolated mode. The octree structure corresponds to three dimensional (3D) partitions of a space of the point cloud. Then the processing circuitry determines, based on information of one or more other nodes, a single isolated point flag for the current node that indicates whether the current node is coded with a single isolated point.

17 Claims, 13 Drawing Sheets

(56) References Cited

OTHER PUBLICATIONS

Lasserre S et al: "[PCC] Inference of a mode using point location direct coding in TMC3", 121. MPEG Meeting; Jan. 22, 2018-Jan. 26, 2018; Gwangju; (Motion Picture Expert Group or ISO/IEC JTC1/SC29/WG11), No. m42239 Jan. 21, 2018, pp. 1-8.
Anonymous: "G-PCC codec description", 131. MPEG Meeting; Jun. 29, 2020-Jul. 3, 2020; Online; (Motion Picture Expert Group or ISO/IEC JTC1/SC29/WG11), No. n19525, Oct. 10, 2020, pp. 1-140.
Rufael Mekuria et al., "Requirements for Point Cloud Compression", International Organisation For Standardisation Organisation Internationale De Normalisation ISO/IEC JTC1/SC29/WG11 Coding Of Moving Pictures And Audio, ISO/IEC JTC1/SC29/WG11 MPEG2016/n16330, Geneva, CH, Feb. 2016 (3 pages).
Christian Tulvan et al., "Use Cases for Point Cloud Compression (PCC)", International Organisation For Standardisation Organisation Internationale De Normalisation ISO/IEC JTC1/SC29/WG11 Coding Of Moving Pictures And Audio, ISO/IEC JTC1/SC29/WG11 MPEG2015/ N16331, Geneva, CH, Jun. 2016 (8 pages).
"G-PCC codec description v2", International Organisation For Standardisation Organisation Internationale De Normalisation ISO/IEC JTC1/SC29/WG11 Coding Of Moving Pictures And Audio, ISO/IEC JTC1/SC29/WG11 N18189, Source: 3DG , Marrakech, MA, Jan. 2019 (40 pages).
"Information technology—MPEG-I (Coded Representation of Immersive Media)—Part 9: Geometry-based Point Cloud Compression", CD stage, ISO/IEC 23090-9:2019(E), ISO/IEC JTC 1/SC 29/WG 11 (104 pages).
International Search Report Issued in Application PCT/US2021/039410 dated Sep. 30, 2021, (3 pages).
Written Opinion Issued in Application PCT/US2021/039410 dated Sep. 30, 2021 (9 pages).

\* cited by examiner

| | Descriptor |
|---|---|
| geometry_node( depth, nodeIdx, xN, yN, zN, numSiblings ) { | |
|   if ( geomIsolatedModeFlag && depth <= geomIsolatedModeMaxDepth ) { // check the eligibility of isolated mode | ← 1101 |
|     if (numSiblings == 1 ) { // in this case, the parent node is always eligible for the isolated mode | |
|       geom_isolated_flag = 0 | ← 1102 |
|     } | |
|     else { | |
|       geom_isolated_flag | ← 1103 ae(1) |
|     } | |
|   } | |
|   if ( geom_isolated_flag ) { | ← 1104 |
|     isolated_position_x | u(n) |
|     isolated_position_y | u(n) |
|     isolated_position_z | u(n) |
|   } | |
|   if (!geom_isolated_flag) { | ← 1105 |
|     occupancy_map | ae(v) |
|   } | |
|   ... | |
| } | |

FIG. 11

METHOD AND APPARATUS FOR POINT CLOUD CODING

INCORPORATION BY REFERENCE

This present application claims the benefit of priority to U.S. Provisional Application No. 63/114,451, "METHODS OF CODING ISOLATED POINTS FOR POINT CLOUD CODING" filed on Nov. 16, 2020, which is incorporated by reference herein in its entirety.

TECHNICAL FIELD

The present disclosure describes embodiments generally related to point cloud coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit.

SUMMARY

Aspects of the disclosure provide methods and apparatuses for point cloud compression and decompression. In some examples, an apparatus for point cloud compression/decompression includes processing circuitry. In some examples, the processing circuitry receives a bitstream carrying compressed data for a point cloud. The processing circuitry determines that a current node in an octree structure is eligible for an isolated mode. The octree structure corresponds to three dimensional (3D) partitions of a space of the point cloud. Then the processing circuitry determines, based on information of one or more other node, a single isolated point flag for the current node that indicates whether the current node is coded with a single isolated point.

In some embodiments, the processing circuitry determines, based on information of at least one of a parent node, a grandparent node, and a sibling node for the current node, the single isolated point flag that indicates whether the current node is coded with the single isolated point. In some examples, the processing circuitry infers that the single isolated point flag for the current node has a false value in response to the parent node having one child node. In some examples, the processing circuitry determines a context model based on a number of child nodes of the parent node and decodes, from the bitstream, the single isolated point flag for the current node based on the context model.

In some embodiments, the processing circuitry determines a context model based on information of a sibling node for the current node, and decodes, from the bitstream, the single isolated point flag for the current node based on the context model.

In some examples, the processing circuitry decodes, from the bitstream, coordinates of the single isolated point in response to the single isolated point flag having a true value.

In some examples, the processing circuitry decodes, from the bitstream, an occupancy code of the current node in response to the single isolated point flag having a false value.

Aspects of the disclosure also provide a non-transitory computer-readable medium storing instructions which when executed by a computer for point cloud encoding/decoding cause the computer to perform any one or a combination of the methods for point cloud encoding/decoding.

BRIEF DESCRIPTION OF THE DRAWINGS

Further features, the nature, and various advantages of the disclosed subject matter will be more apparent from the following detailed description and the accompanying drawings in which:

FIG. 11 shows a syntax table according to some embodiments of the disclosure.

DETAILED DESCRIPTION OF EMBODIMENTS

Figure 1:
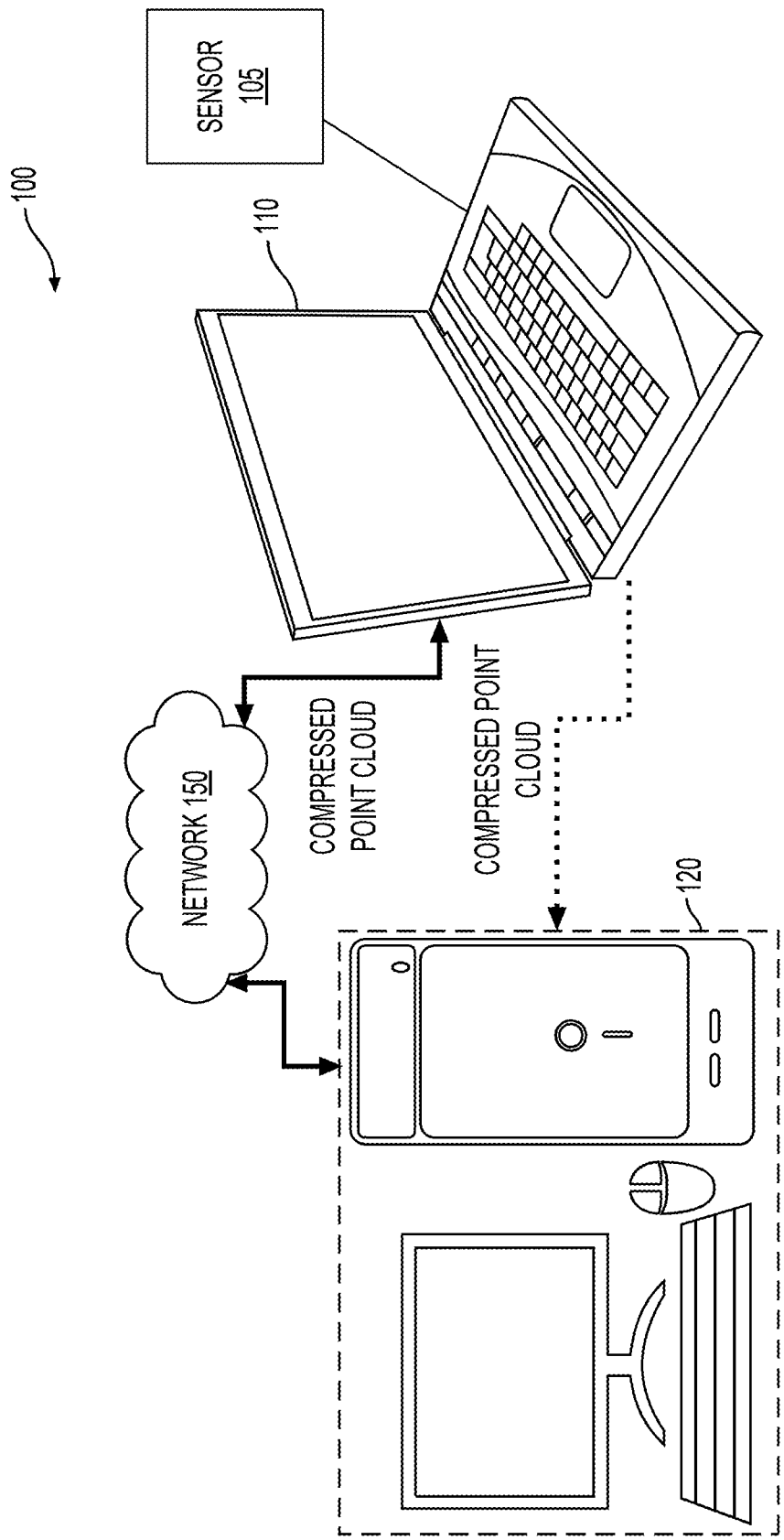
FIG. 1 is a schematic illustration of a simplified block diagram of a communication system in accordance with an embodiment.

Aspects of the disclosure provide point cloud coding (PCC) techniques. PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. Moving picture experts group (MPEG) is working on G-PCC standard and V-PCC standard that respectively using the G-PCC scheme and the V-PCC scheme.

Aspects of the disclosure provide techniques for coding a single isolated point flag for indicating whether a current node is coded with a single isolated point.

Point Clouds can be widely used in many applications. For example, point clouds can be used in autonomous driving vehicles for object detection and localization; point clouds can be used in geographic information systems (GIS) for mapping, and can be used in cultural heritage to visualize and archive cultural heritage objects and collections, etc.

Hereinafter, a point cloud generally may refer to a set of points in a 3D space, each with associated attributes, e.g. color, material properties, texture information, intensity attributes, reflectivity attributes, motion related attributes, modality attributes, and various other attributes. Point clouds can be used to reconstruct an object or a scene as a composition of such points. The points can be captured using multiple cameras, depth sensors or Lidar in various setups and may be made up of thousands up to billions of points in order to realistically represent reconstructed scenes. A patch generally may refer to a contiguous subset of the surface described by the point cloud. In an example, a patch includes points with surface normal vectors that deviate from one another less than a threshold amount.

Compression technologies can reduce the amount of data required to represent a point cloud for faster transmission or reduction of storage. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like.

According to an aspect of the disclosure, the main philosophy behind V-PCC is to leverage existing video codecs to compress the geometry, occupancy, and texture of a dynamic point cloud as three separate video sequences. The extra metadata needed to interpret the three video sequences are compressed separately. A small portion of the overall bitstream is the metadata, which could be encoded/decoded efficiently using software implementation. The bulk of the information is handled by the video codec.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
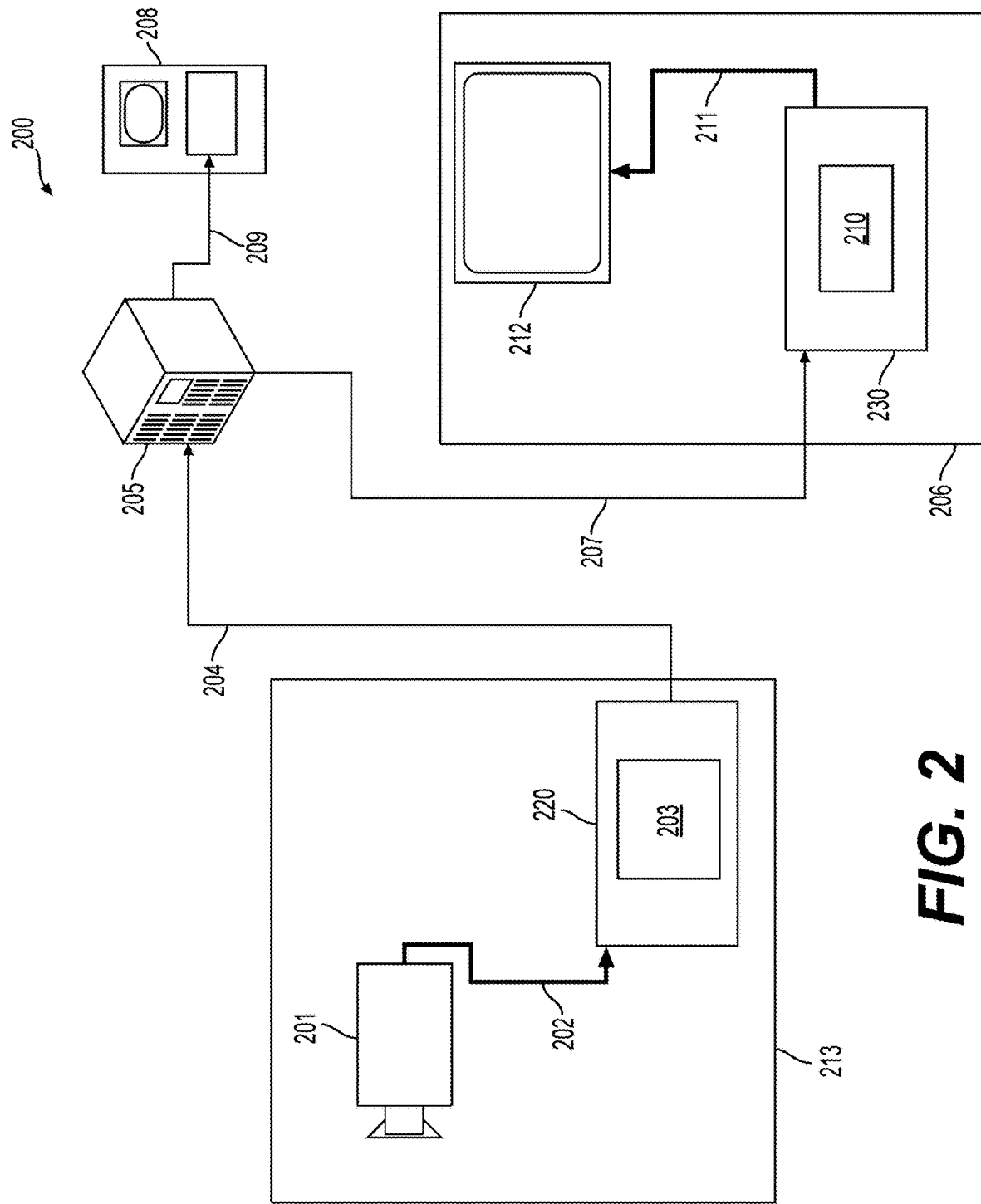
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
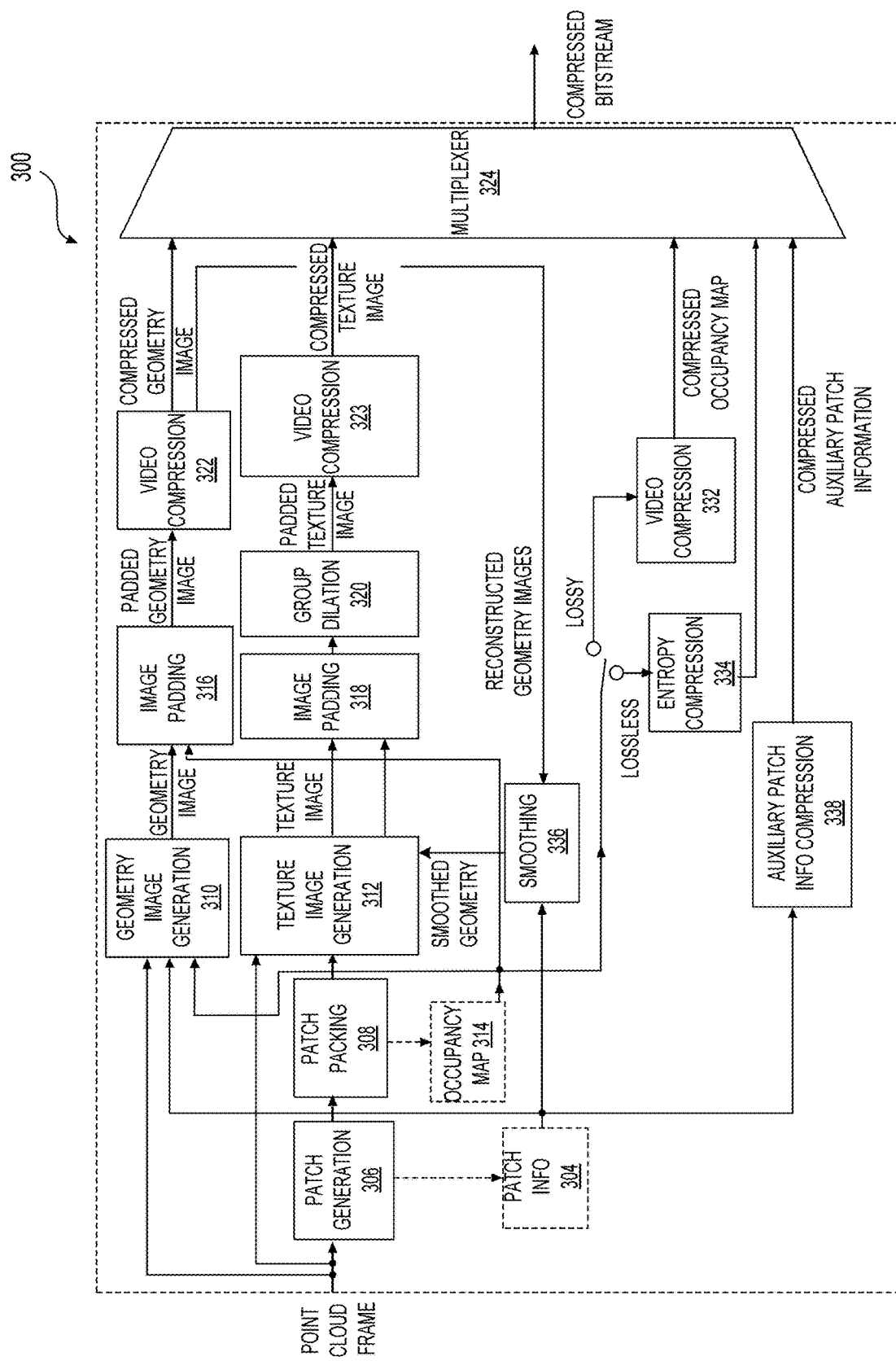
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of WxH in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
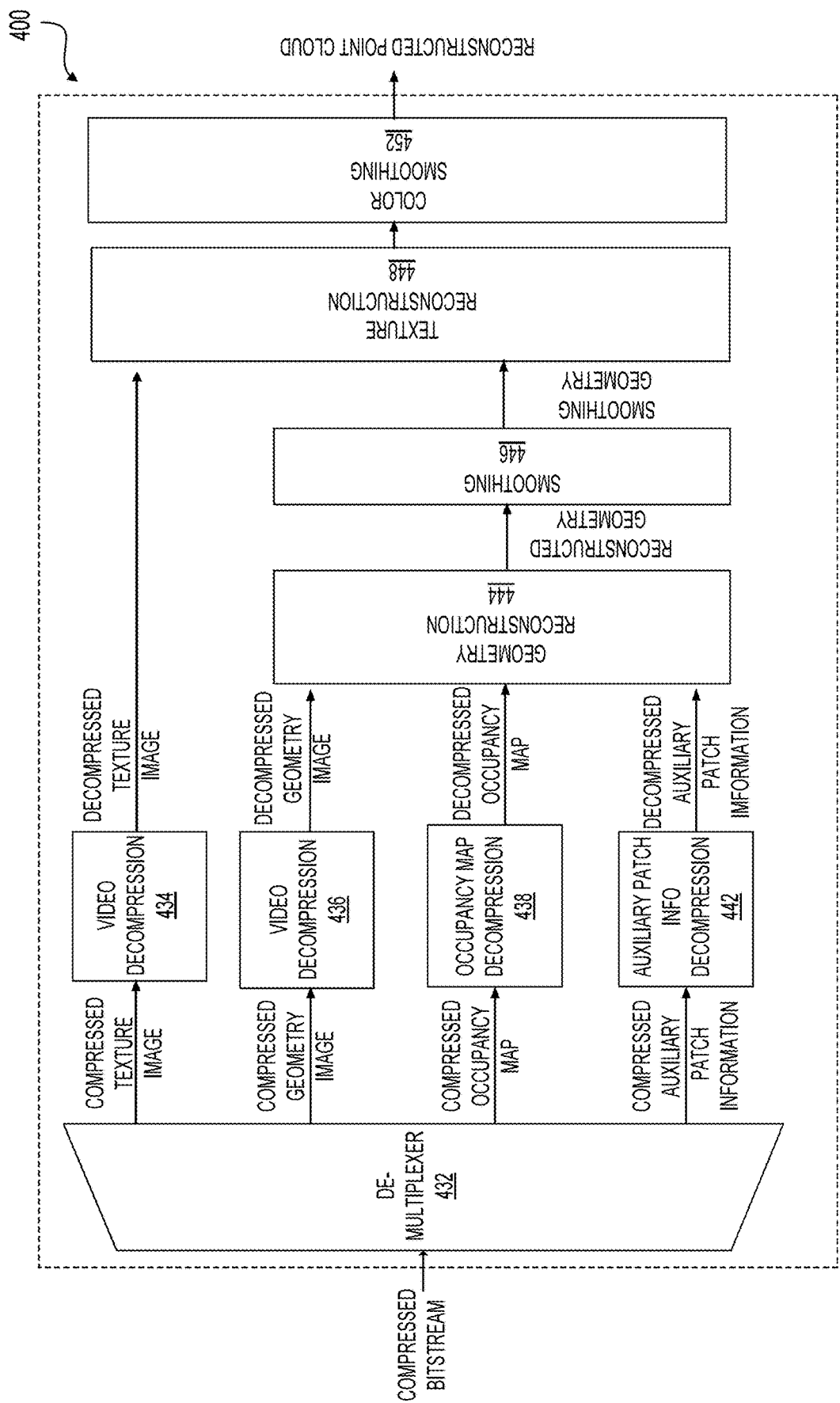
FIG. 4 shows a block diagram of a decoder for decoding a compressed bitstream corresponding to point cloud frames according to some embodiments.

FIG. 4 shows a block diagram of a V-PCC decoder (400) for decoding compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
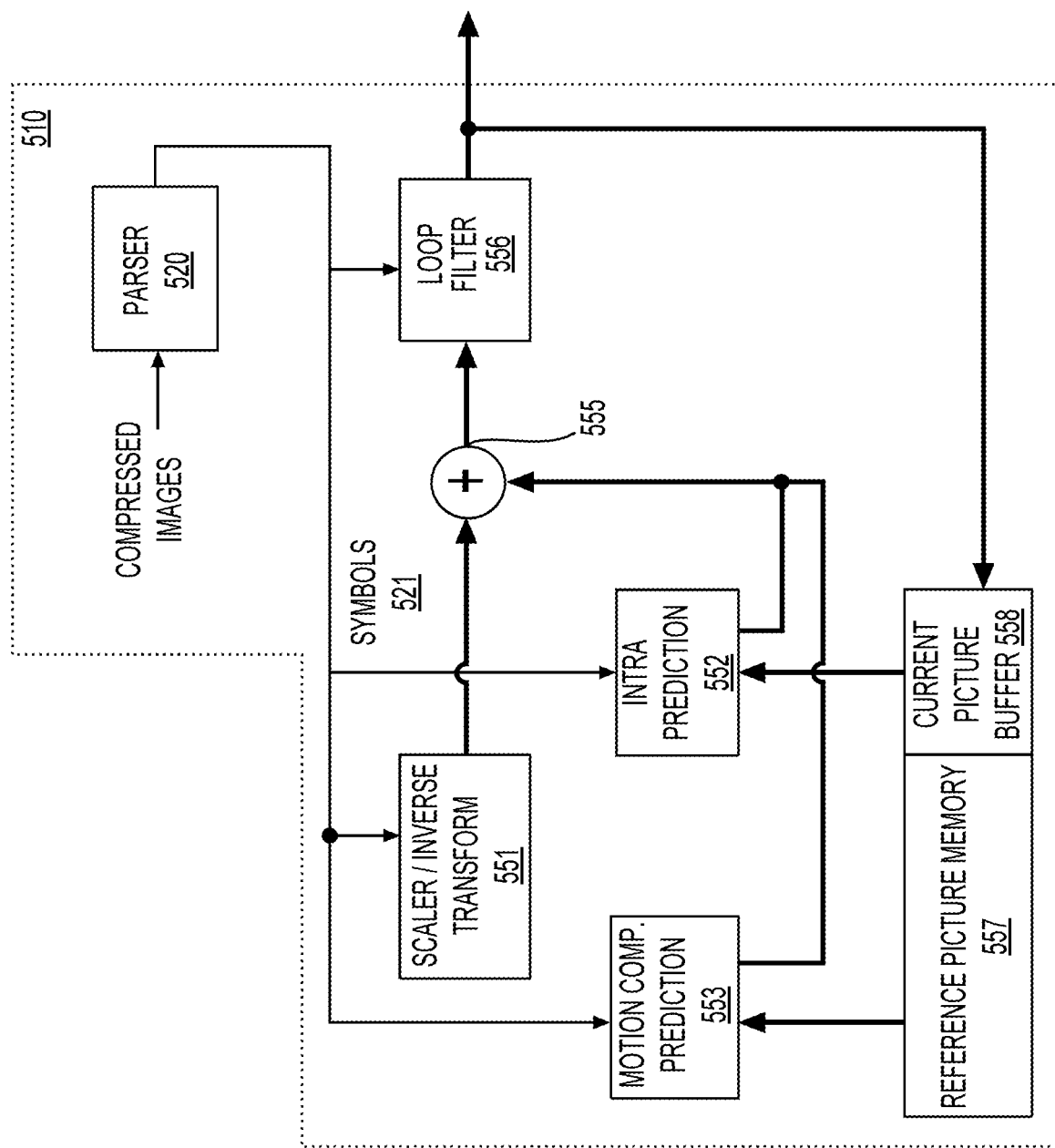
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
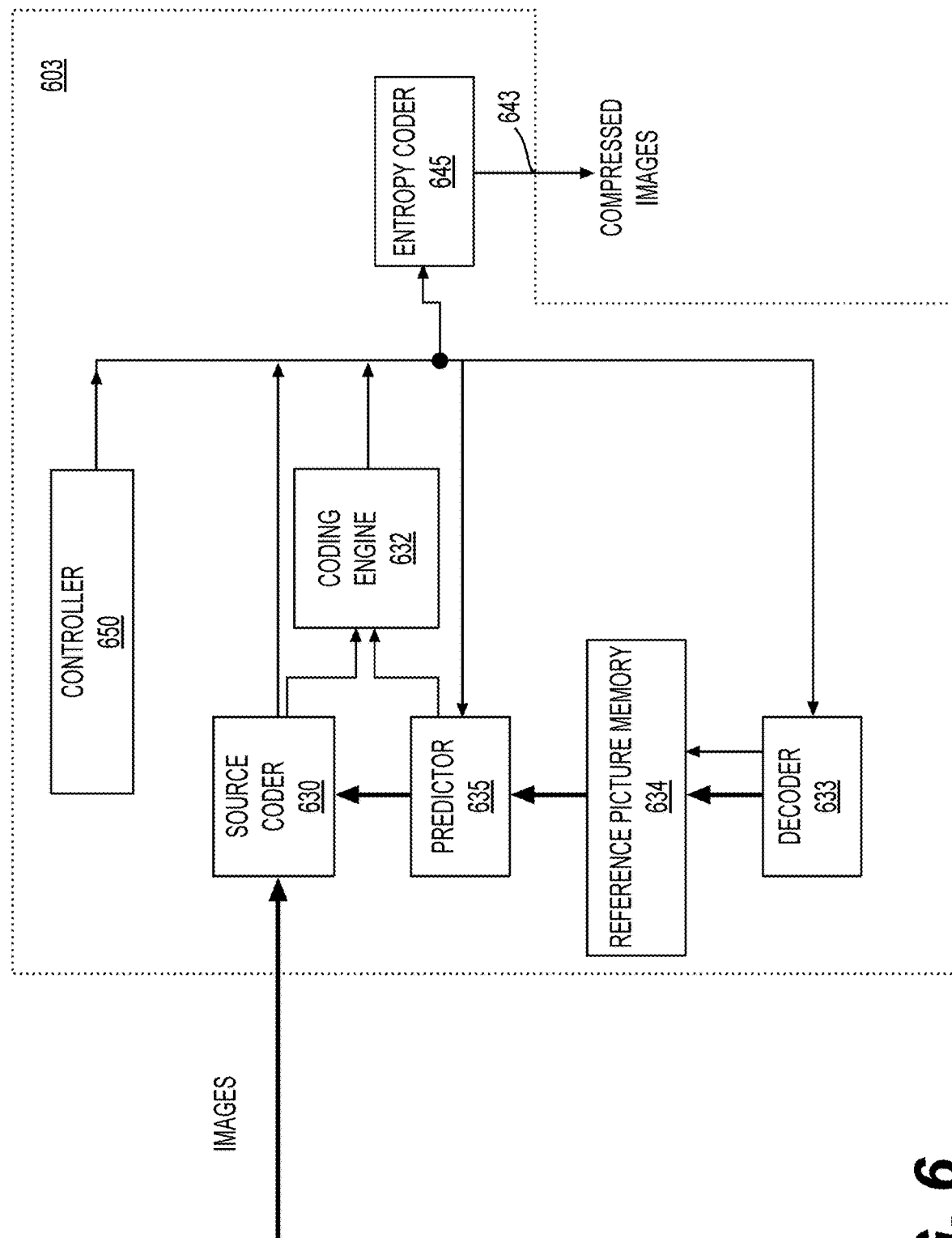
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
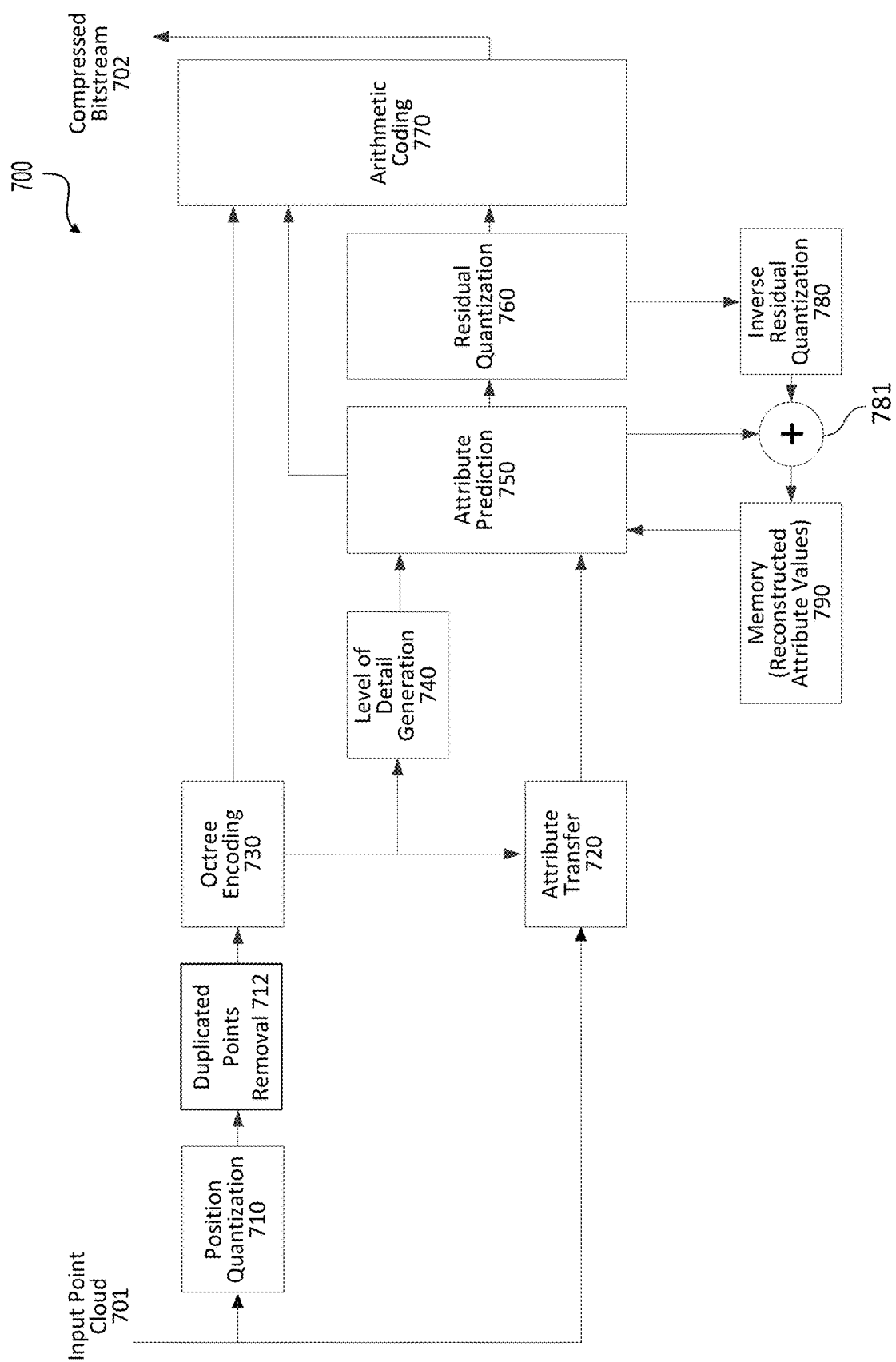
FIG. 7 shows a block diagram of an encoder for encoding point cloud frames, according to some embodiments.

FIG. 7 shows a block diagram of a G-PPC encoder (700) in accordance with some embodiments. The encoder (700) can be configured to receive point cloud data and compress the point cloud data to generate a bit stream carrying compressed point cloud data. In an embodiment, the encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
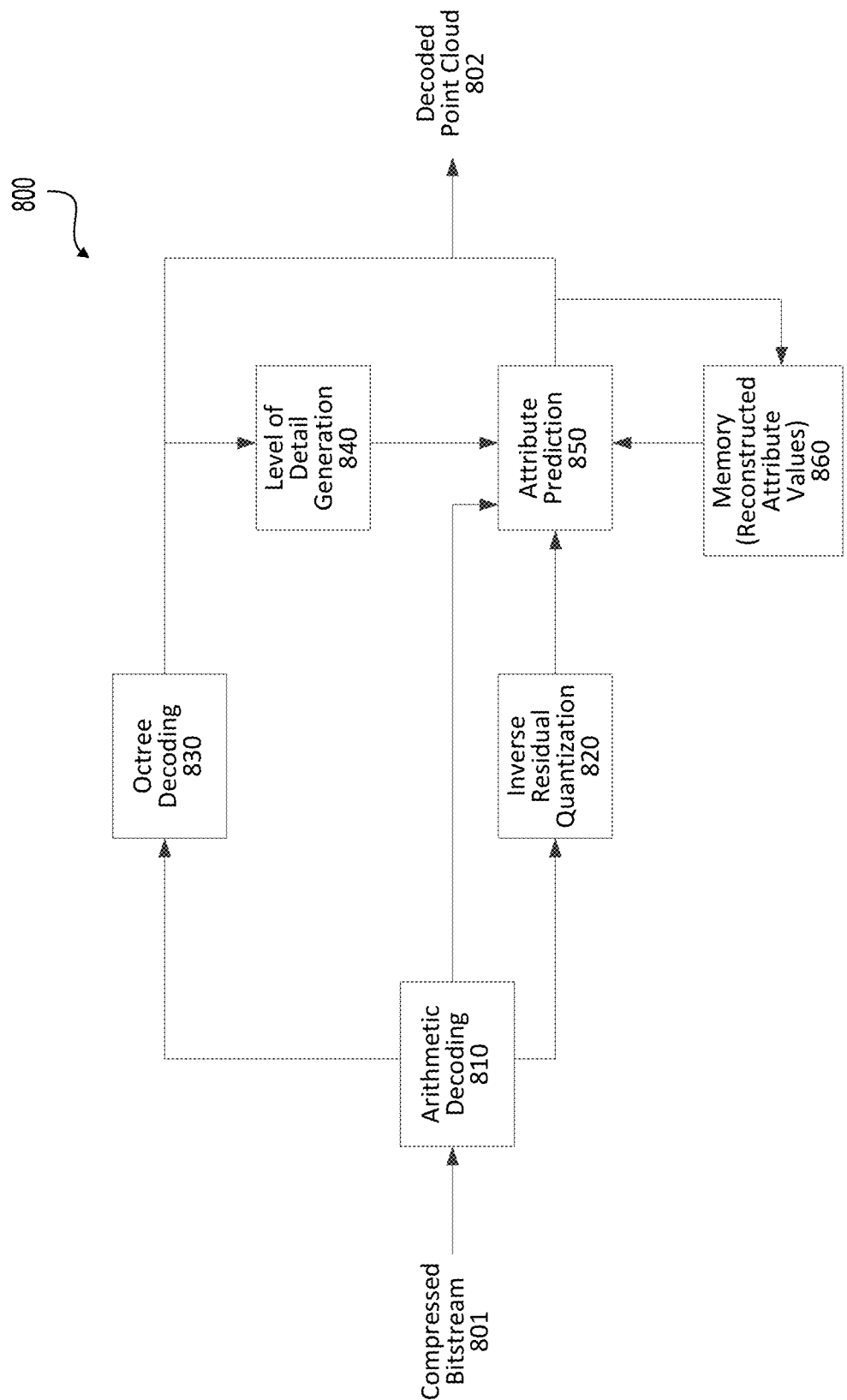
FIG. 8 shows a block diagram of a decoder for decoding a compressed bitstream corresponding to point cloud frames according to some embodiments.

FIG. 8 shows a block diagram of a G-PCC decoder (800) in accordance with an embodiment. The decoder (800) can be configured to receive a compressed bitstream and perform point cloud data decompression to decompress the bitstream to generate decoded point cloud data. In an embodiment, the decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). The attribute prediction module (850) can combine the attribute prediction with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, geometry information and the associated attributes of a point cloud, such as color, reflectance and the like can be separately compressed (e.g., in the Test Model 13 (TMC13) model). The geometry information of the point cloud, which includes the 3D coordinates of the points in the point cloud, can be coded by an octree partition with occupancy information of the partitions. The attributes can be compressed based on a reconstructed geometry using, for example, prediction, lifting and region adaptive hierarchical transform techniques.

According to some aspects of the disclosure, a three dimensional space can be partitioned using octree partition. Octrees are the three dimensional analog of quadtrees in the two dimensional space. Octree partition technique refers to the partition technique that recursively subdivides three dimensional space into eight octants, and an octree structure refers to the tree structure that represents the partitions. In an example, each node in the octree structure corresponds to a three dimensional space, and the node can be an end node (no more partition, also referred to as leaf node in some examples) or a node with a further partition. A partition at a node can partition the three dimensional space represented by the node into eight octants. In some examples, nodes corresponding to partitions of a specific node can be referred to as child nodes of the specific node.

Figure 9:
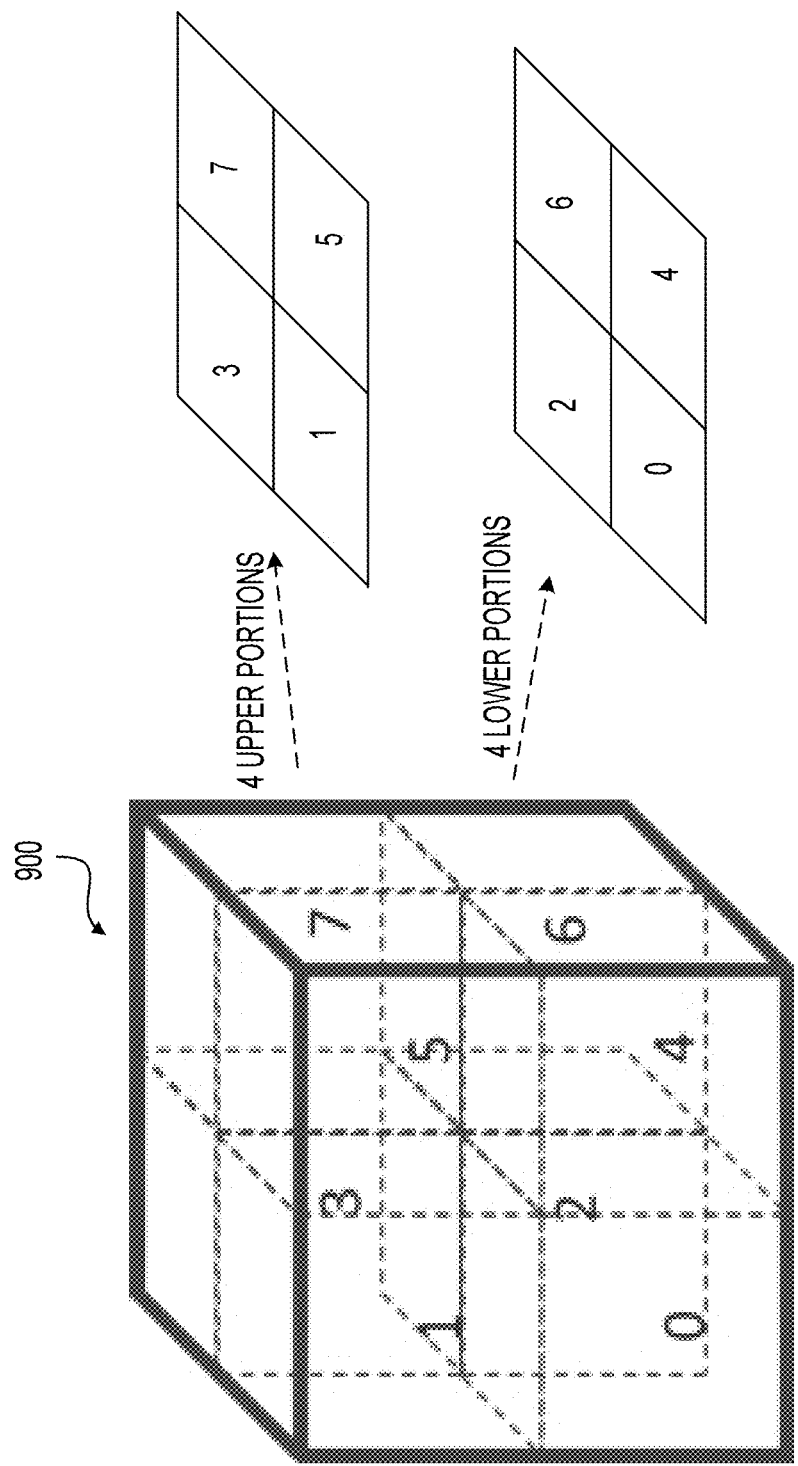
FIG. 9 shows a diagram illustrating a partition of a cube based on the octree partition technique according to some embodiments of the disclosure.

FIG. 9 shows a diagram illustrating a partition of a 3D cube (900) (corresponding to a node) based on the octree partition technique according to some embodiments of the disclosure. The partition can divide the 3D cube (900) into eight smaller equal-sized cubes 0-7 as shown in FIG. 9.

The octree partition technique (e.g., in TMC13) can recursively divide an original 3D space into the smaller units, and the occupancy information of every sub-space can be encoded to represent geometry positions.

In some embodiments (e.g., In TMC13), an octree geometry codec is used. The octree geometry codec can perform geometry encoding. In some examples, geometry encoding is performed on a cubical box. For example, the cubical box can be an axis-aligned bounding box B that is defined by two points (0,0,0) and $(2^{M-1}, 2^{M-1}, 2^{M-1})$, where $2^{M-1}$ defines the size of the bounding box B and M can be specified in the bitstream.

Then, an octree structure is built by recursively subdividing the cubical box. For example, the cubical box defined by the two points (0,0,0) and $(2^{M-1}, 2^{M-1}, 2^{M-1})$ is divided into 8 sub cubical boxes, then an 8-bit code, that is referred to as an occupancy code, is generated. Each bit of the occupancy code is associated with a sub cubical box, and the value of the bit is used to indicate whether the associated sub cubical box contains any points of the point cloud. For example, value 1 of a bit indicates that the sub cubical box associated with the bit contains one or more points of the point cloud; and value 0 of a bit indicates that the sub cubical box associated with the bit contains no point of the point cloud.

Further, for empty sub cubical box (e.g., the value of the bit associated with the sub cubical box is 0), no more division is applied on the sub cubical box. When a sub cubical box has one or more points of the point cloud (e.g., the value of the bit associated with the sub cubical box is 1), the sub cubical box is further divided into 8 smaller sub cubical boxes, and an occupancy code can be generated for the sub cubical box to indicate the occupancy of the smaller sub cubical boxes. In some examples, the subdivision operations can be repetitively performed on non-empty sub cubical boxes until the size of the sub cubical boxes is equal to a predetermined threshold, such as size being 1. In some examples, the sub cubical boxes with a size of 1 are referred to as voxels, and the sub cubical boxes that have larger sizes than voxels can be referred to as non-voxels.

Figure 10:
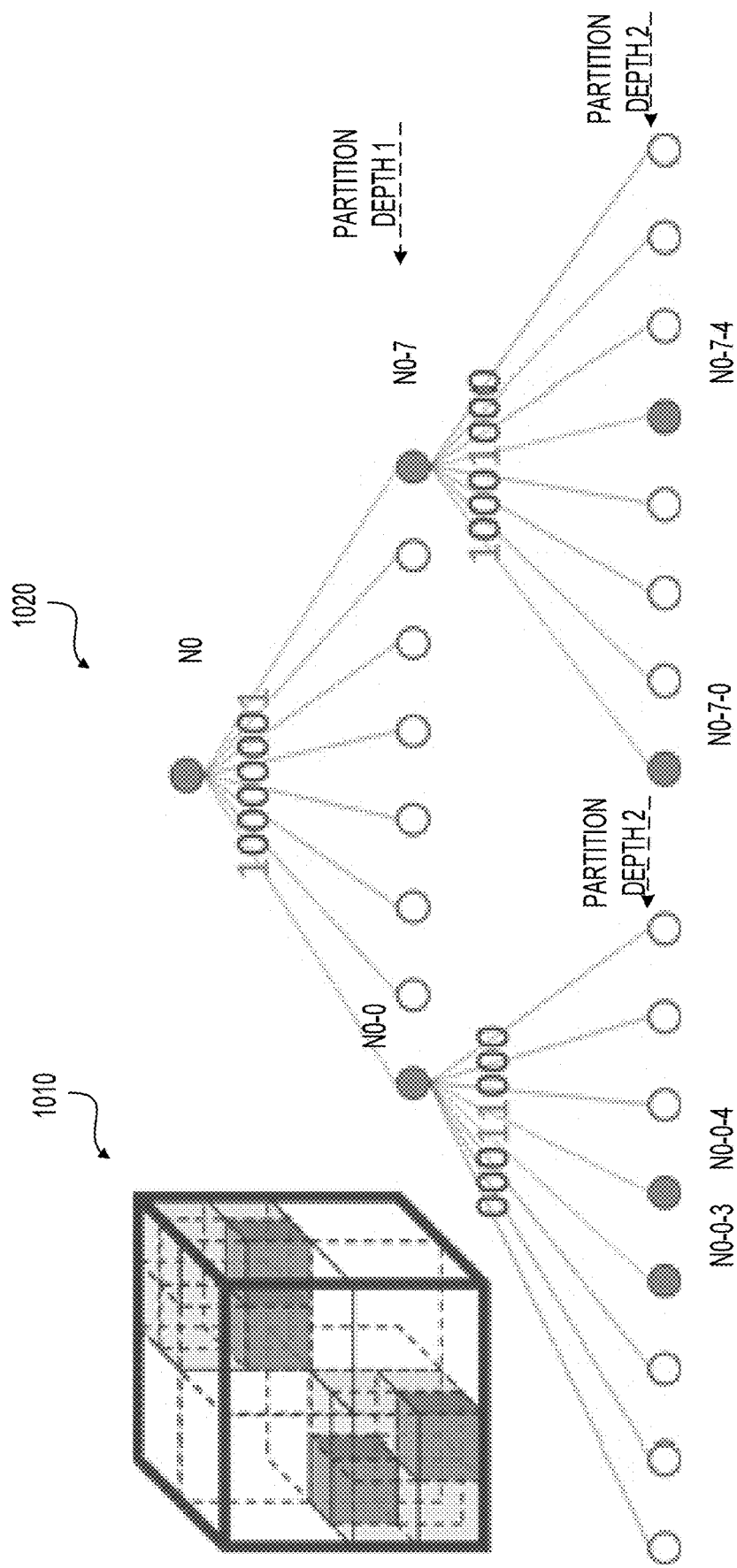
FIG. 10 shows an example of an octree partition and an octree structure corresponding to the octree partition according to some embodiments of the disclosure.

FIG. 10 shows an example of an octree partition (1010) and an octree structure (1020) corresponding to the octree partition (1010) according to some embodiments of the disclosure. FIG. 10 shows two levels of partitions in the octree partition (1010). The octree structure (1020) includes a node (N0) corresponding to the cubical box for octree partition (1010). At a first level, the cubical box is partitioned into 8 sub cubical boxes that are numbered 0-7 according to the numbering technique shown in FIG. 9. The occupancy code for the partition of the node N0 is "10000001" in binary, which indicates the first sub cubical box represented by node N0-0 and the eighth sub cubical box represented by node N0-7 includes points in the point cloud and other sub cubical boxes are empty.

Then, at the second level of partition, the first sub cubical box (represented by node N0-0) and the eighth sub cubical box (represented by node N0-7) are further respectively sub-divided into eight octants. For example, the first sub cubical box (represented by node N0-0) is partitioned into 8 smaller sub cubical boxes that are numbered 0-7 according to the numbering technique shown in FIG. 9. The occupancy code for the partition of the node N0-0 is "00011000" in binary, which indicates the fourth smaller sub cubical box (represented by node N0-0-3) and the fifth smaller sub cubical box (represented by node N0-0-4) includes points in the point cloud and other smaller sub cubical boxes are empty. At the second level, the eighth sub cubical box (represented by node N0-7) is similarly partitioned into 8 smaller sub cubical boxes as shown in FIG. 10.

In the FIG. 10 example, the nodes corresponding to non-empty cubical space (e.g., cubical box, sub cubical boxes, smaller sub cubical boxes and the like) are colored in grey, and referred to as shaded nodes.

According to some aspects of the disclosure, the occupancy codes can be suitably compressed using suitable coding techniques. In some embodiments, an arithmetic encoder is used to compress an occupancy code of a current node in the octree structure. The occupancy code can be denoted as S which is an 8-bit integer, and each bit in S indicates an occupancy status of a child node of the current node. In an embodiment, the occupancy code is encoded using a bit wise encoding. In another embodiment, the occupancy code is encoded using a byte wise encoding. In some examples (e.g., TMC13), the bit-wise encoding is enabled by default. Both of the bit wise encoding and the byte wise encoding can perform arithmetic coding with context modeling to encode the occupancy code. The context status can be initialized at the beginning of the whole coding process for the occupancy codes and is updated during the coding process of the occupancy codes.

In an embodiment of bit-wise encoding to encode an occupancy code for a current node, eight bins in S for the current node are encoded in a certain order. Each bin in S is encoded by referring to the occupancy status of neighboring nodes of the current code and/or child nodes of the neighboring nodes. The neighboring nodes are at the same level as the current node, and can be referred to as sibling nodes of the current node.

In an embodiment of byte wise encoding to encode an occupancy code for a current node, the occupancy code S (one byte) can be encoded by referring to: (1) an adaptive look up table (A-LUT), which keeps track of the P (e.g., 32) most frequently used occupancy codes; and (2) a cache which keeps track of the last different observed Q (e.g., 16) occupancy codes.

In some examples for byte wise encoding, a binary flag indicating whether S is in the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index in the cache is encoded by using a binary arithmetic encoder. Otherwise, if S is not in the cache, then the binary representation of S is encoded by using a binary arithmetic encoder.

In some embodiments, at a decoder side, a decoding process can start by parsing the dimensions of a bounding box from the bitstream. The bounding box is indicative of the cubical box corresponding to a root node in the octree structure for partitioning the cubical box according to geometry information of the point cloud (e.g., occupancy information for points in the point cloud). The octree structure is then built by subdividing the cubical box according to the decoded occupancy codes.

According to an aspect of the disclosure, a single isolated point is defined as a single point in a node, and can be coded using the geometry coordinates of the single isolated point. In some examples, when the current node is eligible for coding single isolated point (e.g., isolated mode is turned on in a high level syntax, and other suitable conditions are satisfied), a flag (e.g., referred to as a single isolated point flag) is signaled to indicate whether the current node has a single isolated point (also referred to as in a single isolated point mode). If the single isolated point flag at the current node is true, the current node is coded in the single isolated point mode, and the geometry coordinates of the single isolated point are coded directly without further octree partitioning. If the single isolated point flag is false, the current node can be further split until reaching the leaf node.

In some related examples, the single isolated point flag is coded by arithmetic coding with a single context. The single context refers the probability of the single isolated point flag itself. Aspects of the disclosure provide techniques to code the single isolated point flag utilizing information of other nodes, such as the occupancy information of the parent node, information of neighboring nodes (also referred to as sibling nodes), and the coding efficiency of the single isolated point flag can be improved.

According to an aspect of the disclosure, if the parent node of the current node is eligible for the isolated mode, and the parent node has only one child node (e.g., the current node), then the current node cannot be coded in the single isolated point mode. Because if the current node is coded with the single isolated point mode, since the current node is the only child of the parent node, then the parent node has the single isolated point. Thus, the parent node should be coded in the single isolated point mode and won't be further partitioned and the current node wouldn't be reached. By utilizing the above reasoning, the single isolated point flag for the current node can be inferred to be false (e.g., having a value of "0") instead of explicitly signaled, thus bits can be saved for coding the single isolated point flag.

FIG. 11 shows an example of a syntax table (1100) according to some embodiments of the disclosure. The syntax table (1100) can be used to decode and determine geometry information at a current node.

In the syntax table (1100), a variable "depth" indicates the partition depth of the current node, and the current node can be identified using an index "nodeIdx". In the syntax table (1100), information, such as value of a variable "numSiblings" is received from a parent node. The variable "numSiblings" specifies the number of sibling nodes (e.g., including the current node) as the current node, and is a positive integer. The value of the variable "numSiblings" is a sum of non-empty child nodes from the occupancy code of the parent node. For example, when the occupancy code of the parent node is "10000011", the value of the variable "numSiblings" is 3; and when the occupancy code of the parent node is "00000010", the value of the variable "numSiblings" is 1.

In the syntax table (1100), a parameter "geomIsolatedModeFlag" is specified in a high level syntax to indicate whether the isolated mode is allowed, and a parameter "geomIsolatedModeMaxDepth" is specified in a high level syntax to indicate a maximum partition depth for the isolated mode. The conditions shown by (1101) check the eligibility of the isolated mode for the current node. For example, when the parameter "geomIsolatedModeFlag" is true (e.g., having value of "1") and the variable "depth" is smaller than or equal to the parameter "geomIsolatedModeMaxDepth", the isolated mode is eligible at the current node. It is noted that the eligibility test is not limited to the conditions shown by (1101), and can have other suitable form.

In the FIG. 11 example, when the current node is eligible of the isolated mode, and if the variable "numSiblings" is equal to one (indicating that the parent node has only one child node that is the current node), a flag "geom_isolated_flag" for indicating the single isolated point mode can be inferred, shown by (1102) in FIG. 11, to be false (e.g., having value of "0") to indicate that the current node is not coded in the single isolated point mode.

In the FIG. 11 example, when the current node is eligible of the isolated mode, and if the variable "numSiblings" is not equal to 1 (larger than 1, the parent node has two or more child nodes), then the flag "geom_isolated_flag" is signaled and can be decoded from the bitstream, as shown by (1103) in FIG. 11.

Further, in the FIG. 11 example, variables "isolated_position_x", "isolated_position_y" and "isolated_position_z" are used to specify coordinates of the position of the single isolated point. For example, when the flag "geom_isolated_flag" is true (e.g., having a value of "1"), the variables "isolated_position_x", "isolated_position_y" and "isolated_position_z" can be decoded from the bitstream, as shown by (1104) in FIG. 11.

Further, in the FIG. 11 example, when the flag "geom_isolated_flag" is false (e.g., having a value of "0"), the current node is further partitioned, and then an occupancy code can be decoded from the bitstream, as shown by (1105) in FIG. 11.

According to another aspect of the disclosure, the single isolated point flag can be coded with arithmetic coding, with additional contexts. Based on the additional contexts, a context model can be determined, and the single isolated point flag can be coded with better coding efficiency. For example, the information from neighboring coded nodes and/or the information from the parent node can be used as the additional contexts. In an embodiment, the number of sibling nodes, such as the variable "numSiblings", is used as the additional context for coding the single isolated point flag. In another example, when the parent node has multiple child nodes, and the current node is coded after some sibling nodes, then the information of the coded sibling nodes before the current node can be used as the additional context for coding the single isolated point flag.

Figure 12:
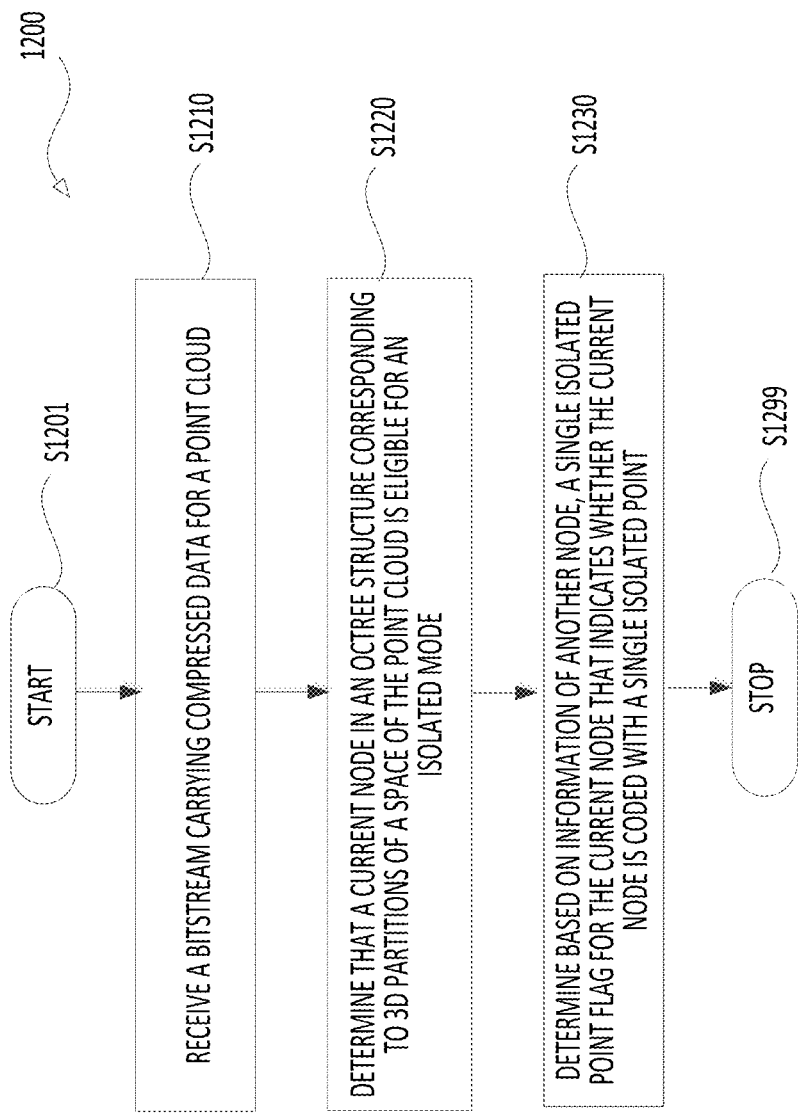
FIG. 12 shows a flow chart outlining a process example in accordance with some embodiments.

FIG. 12 shows a flow chart outlining a process (1200) according to an embodiment of the disclosure. The process (1200) can be used during a decoding process for a point cloud. In various embodiments, the process (1200) is executed by processing circuitry, such as the processing circuitry in the terminal devices (110), the processing circuitry that performs functions of the encoder (203) and/or the decoder (210), the processing circuitry that performs functions of the encoder (300), the decoder (400), the encoder (700), and/or the decoder (800), and the like. In some embodiments, the process (1200) is implemented in software instructions, thus when the processing circuitry executes the software instructions, the processing circuitry performs the process (1200). The process starts at (S1201) and proceeds to (S1210).

At (S1210), a bitstream carrying compressed data for a point cloud is received.

At (S1220), a current node in an octree structure corresponding to three dimensional (3D) partitions of a space of the point cloud is determined to be eligible for an isolated mode.

At (S1230), a single isolated point flag for the current node that indicates whether the current node is coded with a single isolated point is determined based on information of another node.

In some embodiments, the single isolated point flag is determined, based on information of a parent node for the current node. In some examples, the single isolated point flag for the current node is inferred to have a false value (e.g., "0") in response to the parent node having only one child node. In some examples, a context model is determined based on a number of child nodes of the parent node, and the single isolated point flag for the current node is decoded from the bitstream based on the context model.

In some embodiments, the single isolated point flag is determined, based on information of a sibling node for the current node. For example, a context model is determined based on information of a sibling node for the current node, and the single isolated point flag for the current node is decoded from the bitstream based on the context model.

In some embodiments, in response to the single isolated point flag having a true value, coordinates of the single isolated point are decoded from the bitstream.

In some embodiments, in response to the single isolated point flag having a false value, an occupancy code of the current node is decoded from the bitstream.

Then, the process proceeds to (S1299) and terminates.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
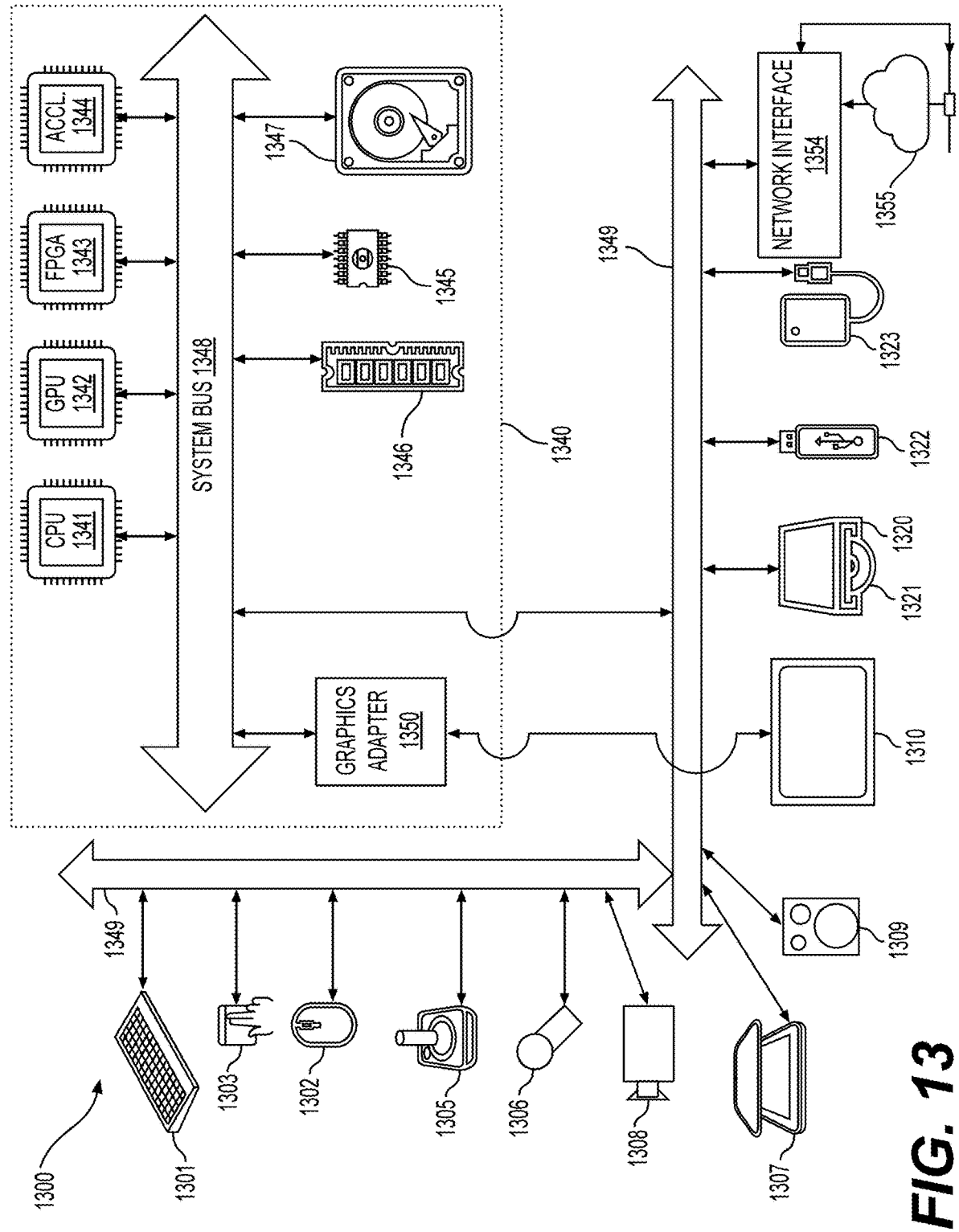
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for point cloud coding, comprising:
   receiving, by a processor, a bitstream carrying compressed data for a point cloud;
   determining, by the processor, that a current node in an octree structure is eligible for an isolated mode, the octree structure corresponding to three dimensional (3D) partitions of a space of the point cloud;
   determining that a parent node of the current node only has a single child node that is the current node; and
   inferring, by the processor, that a single isolated point flag for the current node has a false value in response to the current node being the single child node of the parent node, the single isolated point flag with the false value not being coded in the bitstream and the single isolated point flag with the false value indicating that the current node is not coded with a single isolated point.

2. The method of claim 1, further comprising:
   determining, by the processor and based on information of at least one of theft parent node, a grandparent node and a sibling node for the current node, the single isolated point flag that indicates whether the current node is coded with the single isolated point.

3. The method of claim 2, further comprising:
   determining, by the processor, a context model based on a number of child nodes of the parent node; and
   decoding, by the processor and from the bitstream, the single isolated point flag for the current node based on the context model.

4. The method of claim 3, further comprising:
   decoding, by the processor and from the bitstream, coordinates of the single isolated point in response to the single isolated point flag having a true value.

5. The method of claim 1, further comprising:
   decoding, by the processor and from the bitstream, an occupancy code of the current node in response to the single isolated point flag having the false value.

6. The method of claim 1, further comprising:
   determining, by the processor, a context model based on information of a sibling node for the current node; and
   decoding, by the processor and from the bitstream, the single isolated point flag for the current node based on the context model.

7. An apparatus for point cloud coding, comprising processing circuitry configured to:
   receive a bitstream carrying compressed data for a point cloud;
   determine that a current node in an octree structure is eligible for an isolated mode, the octree structure corresponding to three dimensional (3D) partitions of a space of the point cloud;
   determine that a parent node of the current node only has a single child node that is the current node; and
   infer that a single isolated point flag for the current node has a false value in response to the current node being the single child node of the parent node, the single isolated point flag with the false value not being coded in the bitstream and the single isolated point flag with the false value indicating that the current node is not coded with a single isolated point.

8. The apparatus of claim 7, wherein the processing circuitry is configured to:
   determine, based on information of at least one of theft parent node, a grandparent node and a sibling node for the current node, the single isolated point flag that indicates whether the current node is coded with the single isolated point.

9. The apparatus of claim 8, wherein the processing circuitry is configured to:
   determine a context model based on a number of child nodes of the parent node; and
   decode, from the bitstream, the single isolated point flag for the current node based on the context model.

10. The apparatus of claim 9, wherein the processing circuitry is configured to:
    decode, from the bitstream, coordinates of the single isolated point in response to the single isolated point flag having a true value.

11. The apparatus of claim 7, wherein the processing circuitry is configured to:
    decode, from the bitstream, an occupancy code of the current node in response to the single isolated point flag having theft false value.

12. The apparatus of claim 7, wherein the processing circuitry is configured to:
    determine a context model based on information of a sibling node for the current node; and
    decode, from the bitstream, the single isolated point flag for the current node based on the context model.

13. A non-transitory computer-readable medium storing instructions which when executed by a computer for point cloud coding cause the computer to perform:
    receiving a bitstream carrying compressed data for a point cloud;
    determining that a current node in an octree structure is eligible for an isolated mode, the octree structure corresponding to three dimensional (3D) partitions of a space of the point cloud;
    determining that a parent node of the current node only has a single child node that is the current node; and
    inferring that a single isolated point flag for the current node has a false value in response to the current node being the single child node of the parent node, the single isolated point flag with the false value not being coded in the bitstream and the single isolated point flag with the false value indicating that the current node is not coded with a single isolated point.

14. The non-transitory computer-readable medium of claim 13, wherein the instructions cause the computer to further perform:
    determining, based on information of at least one of they parent node, a grandparent node and a sibling node for the current node, the single isolated point flag that indicates whether the current node is coded with the single isolated point.

15. The non-transitory computer-readable medium of claim 14, wherein the instructions cause the computer to further perform:
    determining a context model based on a number of child nodes of the parent node; and
    decoding, from the bitstream, the single isolated point flag for the current node based on the context model.

16. The non-transitory computer-readable medium of claim 15, wherein the instructions cause the computer to further perform:
- decoding, from the bitstream, coordinates of the single isolated point in response to the single isolated point flag having a true value.

17. The non-transitory computer-readable medium of claim 13, wherein the instructions cause the computer to further perform:
- determining a context model based on information of a sibling node for the current node; and
- decoding, from the bitstream, the single isolated point flag for the current node based on the context model.

\* \* \* \* \*